United States Patent [19]
Woyton et al.

[11] 4,168,611
[45] Sep. 25, 1979

[54] ACCELERATION AND/OR DECELERATION CONTROL SYSTEM FOR MECHANICAL POWER DRIVES

[75] Inventors: Joseph T. Woyton, South Bend; Richard L. Meredith, Mishawaka, both of Ind.

[73] Assignee: Reliance Electric Company, Mishawaka, Ind.

[21] Appl. No.: 866,286

[22] Filed: Jan. 3, 1978

[51] Int. Cl.² .......................... F15B 1/02; F15B 11/04; F15B 13/044
[52] U.S. Cl. ...................................... 60/413; 60/494; 60/DIG. 2; 74/752C; 198/855
[58] Field of Search ................. 60/328, 413, 435, 439, 60/459, 468, 494, DIG. 2; 74/336 R, 752 C; 192/4 R; 198/854, 855

[56] References Cited
U.S. PATENT DOCUMENTS

| | | | |
|---|---|---|---|
| 3,724,720 | 4/1973 | Bullivant | 198/855 X |
| 4,047,452 | 9/1977 | Eddy | 74/752C |

Primary Examiner—Edgar W. Geoghegan
Attorney, Agent, or Firm—M. A. Hobbs

[57] ABSTRACT

A system for controlling the acceleration and/or deceleration of a mechanical power drive having a rotatable power output element and a rotatable reaction element with a hydraulic or pneumatic brake mechanism connected thereto, in which a motor drive pump or other pressure creating device is connected by a fluid pressure line to the brake mechanism, and a bleed line with an electrically controlled valve therein is connected to the fluid pressure line for relieving the pressure delivered by the pump to the brake mechanism. An electrical system responsive to the rotational speed of the output element of the power drive controls the pressure creating means to control the acceleration and/or deceleration rate of the output element. An accumulator and a pressure responsive relief valve are preferably included in the system to assist in regulating the pressure delivered to the brake mechanism, and a dump valve and overload control device are normally included in the system.

25 Claims, 3 Drawing Figures

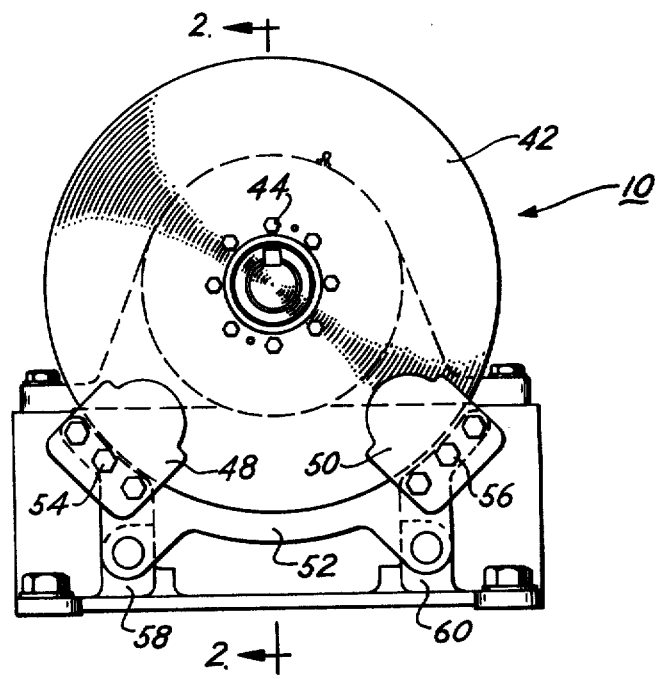
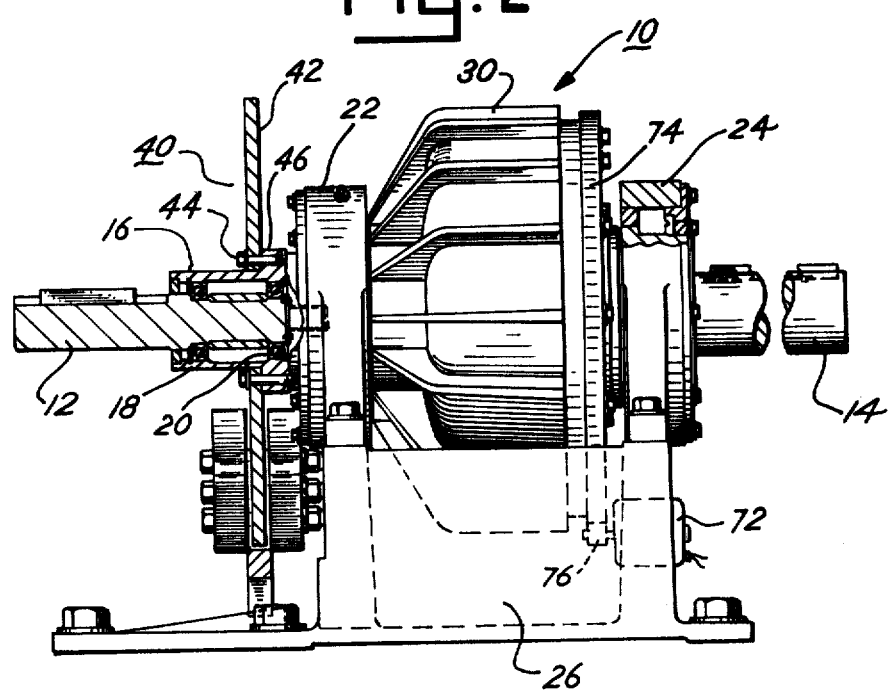

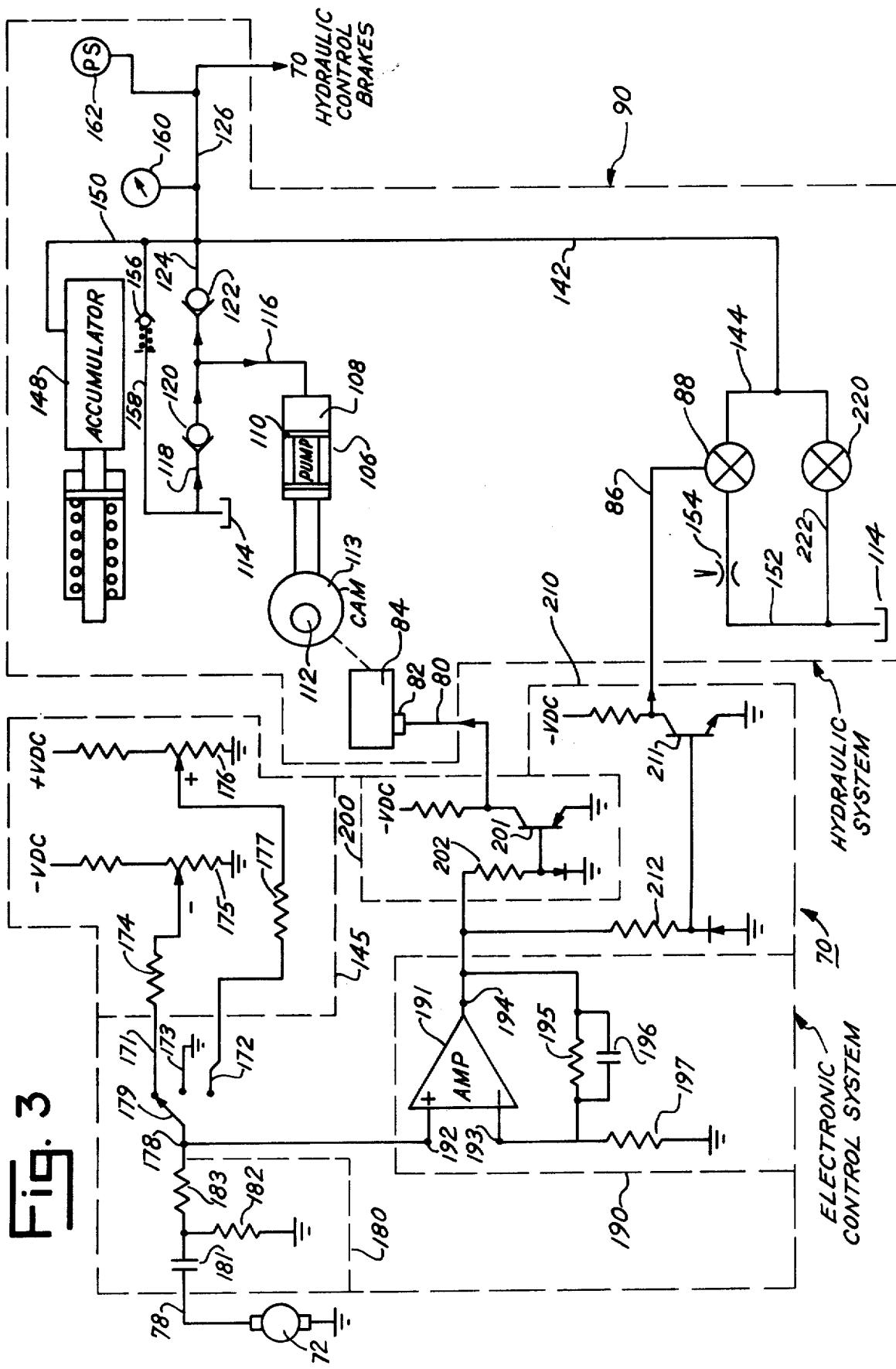

ACCELERATION AND/OR DECELERATION CONTROL SYSTEM FOR MECHANICAL POWER DRIVES

It is frequently desirable to control variable speed reducers and other mechanical power transmission drives in response to the load on the driven equipment and to vary the acceleration and deceleration rates of the drive even though the drive normally operates at a constant speed when in full operation. An example of this type of application and operation is in drives for belt conveyors used for handling heavy materials such as ore, coal, rock and similar material. This type of conveyor equipment is often driven by an electric motor through a speed reducer connected to the shaft of one of the pulleys on which the conveyor belt is trained. The motor and speed reducer may be installed at the end of the driven pulley, or the motor may be installed at the end of the pulley with the speed reducer mounted in the driven pulley as an integral installation. In the latter type of installation, the motor drives the speed reducer through a shaft axially disposed in the main pulley shaft, and the speed reducer reacts directly on the pulley to provide the drive torque therefor. The present invention is adapted to control the drives of either type of installation, and is so constructed and designed as to be responsive to the load on the power output element at the time of starting to provide the required torque, to effect a soft start and thereafter to control the acceleration rate until the conveyor system is at normal operating speed, regardless of the load on the system, thus avoiding a quick start normally involving a sudden jerk, when the system is unloaded or has only a light load. In belt conveyors, sudden starts with no load or only light loads may result in damage to the conveyor system or cause the conveyor belt to loosen to the extent that the conveyor fails to operate, or operates inefficiently.

Variable acceleration of a speed reducer has been effectively accomplished by a brake mechanism used in conjunction with the reaction shaft of the speed reducer operating the driven pulley of the conveyor system. Such a mechanism and installation are disclosed and claimed in U.S. Pat. No. 4,047,452 relating to a belt conveyor drive mechanism. While the patent is directed principally to a drive for a conveyor system, our control system has a more general application and may be used advantageously in controlling other types of mechanical power drives, and used in conjunction with various other types of equipment. In the past, the control systems for mechanical transmission installations of the aforementioned type have not been adequately responsive to the load or other operating conditions and/or have not been capable of use in various applications other than conveyor systems. It is therefore one of the principal objects of the present invention to provide an acceleration and deceleration control system for a mechanical power drive, which directly and instantaneously senses a change in speed of the controlled drive or equipment to maintain a desired acceleration or deceleration rate, and which, in effect, senses the power input and load ratio to control the effective power output of the drive.

Another object of the invention is to provide an acceleration and deceleration control system for mechanical power transmission equipment which is highly reliable and efficient in conservation of energy, and which can be operated for prolonged periods of time under adverse conditions without attention or adjustment by an operator once the desired rate of acceleration and deceleration has been selected for the various operating parameters and conditions.

A further object of the invention is to provide a system for controlling the acceleration and deceleration rate of a mechanical power drive which normally operates at a substantially constant speed, and which can be adapted to various applications without substantial modification in the basic system, utilizing an electronic signal derived from a change in speed to regulate a hydraulic system for variably controlling the operation of power transmission equipment.

Still another object is to provide an acceleration and/or deceleration control system of the aforesaid type which is relatively simple in operation and construction, which can be installed and operated in limited areas and under adverse environmental conditions, and which is capable of being used in a wide variety of different applications and types of installations.

Additional objects and advantages of the present invention will become apparent from the following description and accompanying drawings, wherein:

FIG. 1 is an end elevational view of a speed reducer with a brake mechanism thereon used in conjunction with the present acceleration and deceleration control system;

FIG. 2 is a partial elevational and cross sectional view of the speed reducer with the brake mechanism shown in FIG. 1, the section being taken on line 2—2 of the latter figure; and FIG. 3 is a schematic diagram of the electronic and hydraulic systems, of the present acceleration and deceleration control system.

Referring more specifically to the drawings, and to FIGS. 1 and 2 in particular, numeral 10 indicates generally a speed reducer controlled by the present acceleration and deceleration control system. The speed reducer shown may be considered to have conventional gearing for the purpose of the description of the present invention, and the details of the reduction gears are not shown, since the reduction gearing is well known and may be varied to provide the desired reduction from one installation to another. The gear reducer shown may be used for a variety of different applications and installations, and modifications may be made therein to adapt the reducer to a particular installation. Likewise, the present acceleration and deceleration control system can be used with a number of different types of mechanical power drives, the one shown in the drawing being included merely for the purpose of illustrating one application of the present control system.

The speed reducer 10 includes an input shaft 12, an output shaft 14 and a reaction shaft 16 disposed around and coaxially with input shaft 12 and supported on bearings 18 and 20 disposed between shafts 12 and 16. The reaction shaft and output shaft are journaled in main bearings 22 and 24, respectively, which are mounted on and rigidly secured to a base 26, which in turn is normally mounted on a foundation or other supporting structure. The input shaft 12 is driven by an electric motor (not shown) either by a flexible coupling connecting the motor shaft and shaft 12 directly to one another, or by V-belts on pulleys trained on the motor shaft and shaft 12. The output shaft 14 is connected directly to housing 30 containing the reduction gears, and the housing and shaft 14 rotate together when rotation of the reaction shaft is restrained in the manner to be described more fully hereinafter.

The rotation of reaction shaft 16 is controlled by a brake mechanism indicated generally by numeral 40, having a braking disc 42 rigidly connected to the reaction shaft by a plurality of screws 44 extending through the inner edge of the disc into a flange 46 on the reaction shaft. The disc, and hence the reaction force transmitted through shaft 16, are controlled by friction heads 48 and 50 supported on fixture 52 by a plurality of bolts 54 and 56, and the fixture in turn is secured to upwardly extending lugs 58 and 60 on the base, and hence retains the two heads in a fixed position. While two heads are shown, they both perform the same function in response to the same signals and operating pressures, and are hydraulically operated by the hydraulic system shown schematically in FIG. 3. Since the two heads are conventional hydraulic heads for disc brakes, the details of the two heads will not be described in detail herein. The two friction heads are connected to the hydraulic system by a hydraulic line, and are operated in response to the signal produced and transmitted by the electronic control system also shown schematically in FIG. 3.

The electrical input signal to the electronic control system in block or box 70 is obtained from a tachometer 72, shown mounted on base 26 and being driven from a ring gear 74 on reducer housing 30 through a small gear 76 on the shaft of the tachometer. The tachometer is thus responsive to the acceleration and deceleration of the speed reducer, since the ring gear rotates in unison with the housing 30 and output shaft 14. The tachometer shown in FIG. 2 may be driven by a belt, or other suitable coupling means, and other types of speed sensing devices may be used in place of the tachometer, including a pulse wheel or a magnetic pickup. The speed reducer unit shown in FIGS. 1 and 2, which may be used with various types of equipment, is connected to the equipment by any one of a number of well known means, such as a flexible coupling, V-belt, or chain drive connected to shaft 14. Thus, since shaft 14 and the housing 30 on which the gear is mounted are directly connected to one another, the tachometer and the present electronic control system directly sense the output speed of the speed reducer and indirectly the speed of the driven equipment. The signal from the tachometer is fed into electronic control system 70 through lead 78 and, in response to the signal from the tachometer, the control system produces electrical control signals which are transmitted through lead 80 to a relay 82 of a pump motor 84 and through lead 86 to a solenoid bleed valve 88 of the present hydraulic system, schematically represented in block 90.

Referring to FIG. 3, motor 84 drives a pump 106 schematically shown as a reciprocating type having a cylinder 108 and a piston 110 driven by a crank shaft 112 and cam 113. The cylinder 108 is connected to a sump 114 of hydraulic fluid by lines 116 and 118, and a check valve 120 is disposed in line 118 so that on the intake stroke of piston 110, hydraulic fluid is drawn into the system from the sump through line 118, check valve 120 and line 116. On the output stroke of the pump, the hydraulic fluid drawn into the pump and connecting lines is discharged through check valve 122 and line 124 and is forced through line 126 to the two heads 48 and 50 on the brake mechanism 40 of the speed reducer. Thus, when relay 82 is energized, motor 84 and pump 106 increase the hydraulic braking pressure applied to brake mechanism 40. Similarly, bleed valve 88 is connected to brake heads 48 and 50 through lines 126, 142 and 144. This connection, on the one hand, allows the existing pressure at heads 48 and 50 to be maintained or even increased when valve 88 is closed and, on the other hand, allows the hydraulic pressure at heads 48 and 50 to fall when valve 88 is opened. Thus, when solenoid operated valve 88 is open, the hydraulic braking pressure applied to brake mechanism 40 decreases. Line restriction orifice 154 regulates the pressure decrease in brake line 126 when solenoid operated valve 88 is energized.

The hydraulic section of the present acceleration and deceleration control operates in response to the speed of the speed reducer output shaft, as sensed by tachometer 72 which generates a voltage proportional to the speed of the output shaft. As will be described more fully presently, the electronic control system 70 of FIG. 3 controls motor relay 82 which starts and stops the motor 84 in accordance with the preset acceleration and deceleration of the speed reducer as determined by the acceleration and deceleration reference signals generated by reference signal generator 145 of electronic control system 70. More particularly, relay 82 is energized when output shaft 14 is accelerating at less than the desired preset acceleration rate or when output shaft 14 is decelerating at greater than the desired preset deceleration rate and is de-energized at all other times. The electronic control system 70 also controls bleed valve 88 which starts and stops the bleeding of hydraulic pressure from the brake mechanism 40 in accordance with the preset acceleration and deceleration of the speed reducer as determined by the acceleration and deceleration reference signals generated by reference signal generator 145 of electronic control system 70. More particularly, bleed valve 88 is open (energized) when output shaft 14 is accelerating at more than the desired preset acceleration rate or when output shaft 14 is decelerating at less than the desired preset deceleration rate and is closed (de-energized) at other times. Thus, the active states of relay 82 and bleed valve 88 are mutually exclusive, and neither device is active when output shaft 14 is accelerating or decelerating uniformly at the desired preset rate.

In order to stabilize the pressure in the line to the hydraulic brake heads and thereby smooth out the sudden changes in braking force which would otherwise accompany the energization or de-energization of motor relay 82 and bleed valve 88, an accumulator 148, shown herein only in symbolic form, is connected to line 126 by line 150. In this position accumulator 148 operates as an effective low pass filter both with respect to attempted sudden increases in braking force applied through line 124 and with respect to attempted sudden decreases in braking force applied through line 142. This assures that acceleration and deceleration occur smoothly in spite of the fact that both pump 106, and bleed valve 88 operate, if at all, only in their full "on" or full "off" conditions.

The acceleration and deceleration rates of shaft 14 are controlled directly by the hydraulic system by the amount of pressure applied by the two friction heads 48 and 50 on brake disc 42. When output shaft 14 is accelerating at less than the desired preset rate, or is decelerating at greater than the desired preset rate, the pressure provided by pump 106 to line 126 is increased to increase the force supplied by heads 48 and 50 to disc 42, thereby restraining the rotation of reaction shaft 16. As the speed of reaction shaft 16 reduces, the rotational speed of shaft 14 increases proportionally, thereby forcing the rotational speed of the output shaft to increase toward the desired value set by reference signal generator 145. Similarly, if the output shaft 14 is accelerating at greater than the desired preset rate or is decelerating at less than the desired preset rate, the solenoid operated valve 88 opens to discharge hydraulic fluid from line 126 through lines 142, 144, 152, and restriction 154, and thereby reduces the pressure delivered to the two heads 48 and 50. This permits the disc 42 and reaction shaft to rotate more rapidly, hence reducing the rotational speed of shaft 14, thereby forcing the rotational speed of the output shaft to decrease toward the desired value set by reference signal generator 145.

To the end that output shaft 14 may rotate at the desired final running speed between the time that it accelerates to running speed from rest and the time that it decelerates from running speed to rest, in spite of fluctuations in rotational output power, there is provided a relief valve 156 which is connected between accumulator 148 and sump 114 through line 158. Relief valve 156 provides an adjustable ceiling on the pressure in accumulator 148, and thereby an adjustable ceiling on the braking force which is applied to braking mechanism 40 through line 126 and on the rotational speed of output shaft 14. The latter ceiling may be adjusted with the assistance of a pressure gauge 160 that is connected to accumulator 148. Operation in this running mode results from the substantially continuous operation of motor 84 and pump 106, which, in turn, results from the substantially continuous energization of relay 82 by control system 70, after the initial acceleration is complete, as will be described in detail in connection with the following description of control system 70. In anticipation of the fact that relief valve 156 may be subject to excessive wear in continuous operation, a pressure limit switch 162 may be connected generally to pressure line 126. Because relief valve 156 is not intended to operate when the speed reducer system is operating normally at full output speed, the pressure at which limit switch 162 opens should be chosen to be lower than that at which relief valve 156 operates. The limit switch is connected to the power line of pump motor 84, and disconnects the motor when maximum operating pressure has been attained.

In the present embodiment, electronic control system 70 includes a speed reference signal generator 145 having an output 171 for providing an adjustable (negative) acceleration reference signal, an output 172 for providing an adjustable (positive) deceleration reference signal and an output 173 for providing a hold or standby signal. A suitable mode selector switch 179 connected between outputs 171, 172 and 173, and a summing junction 178 allow the operator of the drive system to select whether the drive system will operate in the accelerate and run mode (current flowing from junction 178 through an output current limiting resistor 174 to the negative supply −VDC through a potentiometer 175), will operate in the decelerate mode (current flowing into junction 178 from the positive supply +VDC through a potentiometer 176 and an output current limiting resistor 177), or will operate in a hold or standby mode in which junction 178 is shorted to the control system ground. In accordance with one feature of the present invention, the voltage outputs of potentiometers 175 and 176, respectively, directly determine the slopes of the rotational acceleration and deceleration characteristics of output shaft 14, high voltages whether positive or negative being associated with high rates of change in shaft speed (hard starts or stops), and low voltages whether positive or negative being associated with low rates of change in shaft speed (soft starts or stops). It will be understood that this arrangement allows the acceleration and deceleration characteristics of the speed reducer to be independently adjusted.

Control system 70 also includes a tachometer signal conditioning circuit which here takes the form of a differentiator network 180 including a capacitor 181, a resistor 182 and an output current limiting resistor 183. Conditioning circuit 180 causes the DC tachometer speed signal appearing on input conductor 78 to be differentiated before application to summing junction 178 through resistor 183. As a result of this differentiation, the feedback signal at the output of network 180 will have a positive, constant value when the output shaft that drives tachometer 72 is accelerating at a constant rate, and will have a negative, constant value when the output shaft is decelerating at a constant rate. The feedback signal will have a variable value if the rate of shaft acceleration or deceleration is not constant, and will be zero if the output shaft is being driven at a constant speed. Another result of this differentiation is that it applies to summing junction 178 a rotational speed signal which has the same significance and the same units as the reference speed signal supplied to summing junction 178 by reference signal generator 145. In other words, the summing junction receives from generator 145 a voltage (and current) having a sign and a magnitude dependent upon the desired direction and rate of change in output rotational speed, and receives from differentiating network 180 a voltage (and current) having a sign and a magnitude dependent upon the actual direction and rate of change in output rotational speed.

To the end that the above described rate signals may be compared with a view to determining whether the actual rate of change of output rotational speed is greater or less than the desired rate of change of output rotational speed, electronic control system 70 includes an integrating comparator network 190. In the present embodiment, network 190 includes a suitable operational amplifier 191 having a non-inverting input 192, an inverting input 193 and an output 194. Network 190 also includes a negative feedback resistor 195, high frequency ripple integrating capacitor 196, and an input resistor 197. In this embodiment of the invention, resistor 183 of differentiating network 180 and resistors 174 and 175 of reference generator 145 are all equal and are properly considered to be the input resistors for amplifier input 192. Thus, the amplifier feedback network comprising resistor 195 and capacitor 196 coacts with input resistors 183 and 174 or 175 to afford network 190 a summing and integrating characteristic with respect to the outputs of networks 145 and 180.

As a result of the integrating characteristic of network 190, and as a result of the fact that both during acceleration and during deceleration the differentiated tachometer feedback signal through resistor 183 and the preset reference signal through resistor 174 or 177 are chosen to have opposite polarities, the voltage at amplifier output 194 will vary in accordance with the difference, i.e. the error signal, between the feedback and reference signals applied to summing junction 178. During acceleration from rest, for example, amplifier 191 will amplify and integrate the algebraic sum of the negative reference signal through resistor 174 and the initially zero-value feedback signal through resistor 183. This will cause amplifier output 194 to be driven more and more negative with the passage of time. Eventually, when this voltage becomes sufficiently negative with respect to the control system ground, a first transistor 201 within motor relay driver network 200 will be turned on by current drawn through a resistor 202 to energize relay 82. This, in turn, will cause the previously described sequence of hydraulic events to produce an increase in the rotation speed of output shaft 14 and a corresponding positive feedback signal thru resistor 183.

If the last described positive feedback signal is less than the negative reference signal through resistor 174, amplifier 191 will continue to amplify and integrate the net negative error signal at junction 178 and, therefore, continue to produce, at output 194 thereof, a negative signal sufficient to maintain energization in relay 82. This will cause pump 106 to continue to increase the rotational speed of output shaft 14. Thereafter, should the rotational speed of shaft 14 come to increase at greater than the desired rate, the positive feedback signal through resistor 183 will become larger than the negative reference signal through resistor 174. Under this condition, amplifier 191 will amplify and integrate the net positive error signal at junction 178 and drive its output to less and less negative values. Eventually, when the amplifier output 194 becomes insufficiently negative to overcome the threshold to maintain conduction in transistor 201, relay 82 will de-energize, and thereby stop pump 106 and the accompanying increase in the rate of rotational speed change of output shaft 14. When this occurs, electronic control system 70 will have entered its "dead zone", within which neither pump relay 82 nor solenoid operated bleed valve 88 is energized, and will simply "coast".

If in spite of the entry of the above mentioned "dead zone", output shaft 14 should continue to accelerate at greater than the desired, preset rate, network 190 will continue to amplify and integrate the net positive error signal at junction 178, causing amplifier output 194 to assume an increasing positive value. If this positive error signal integration continues long enough, a condition will be reached in which amplifier output 194 becomes sufficiently positive to overcome the threshold and turn on a second transistor 211 within bleed valve drive network 210, by establishing a drive current through a resistor 212. When this occurs, control system 70 will have once again left its "dead zone" to take action to correct the excessive acceleration. More particularly, under this condition, bleed valve 88 will open and, by reducing the pressure applied to brake mechanism 40, cause a slowing in the rotational speed change of output shaft 14. The latter condition, in turn, causes the polarity of the feedback signal to reverse and thereby restore a net negative error signal at junction 178, a condition which results in the voltage at integrator output 194 being driven less and less positive. Eventually, this condition will result in the turn off of transistor 211 and the associated closing of bleed valve 88. When this occurs, electronic control system 70 will have re-entered its "dead zone" and again simply coast.

In view of the foregoing, it will be seen that when the output shaft 14 accelerates at a uniform rate equal to the rate set by acceleration adjustment potentiometer 175, electronic control system 70 will remain within its "dead zone", i.e., take no corrective action with respect to pump control relay 82 or bleed valve 88. Conversely, should output shaft 14 accelerate at a rate greater or less than the rate set by potentiometer 175, control system 70 will exit its "dead zone" to correct the acceleration rate, by energizing either relay 82 or valve 88, depending upon the need to either speed up or to slow down the rate of speed change of the output shaft 14.

It will be understood that the same corrective mechanism will operate during deceleration, when switch 179 is connected to reference generator output 172. The only difference is that, under the latter condition, the reference signal will be positive while the feedback signal will ordinarily be negative. In view of the fact that the operation of control system 70 in the deceleration mode is the same as that just described for the acceleration mode, the operation of the system in the deceleration mode will not be further described herein.

After acceleration is complete and before deceleration is begun, the speed reducer of the invention will operate in its normal running mode, without moving switch 179 from its acceleration position. This will occur because the attainment of the final running speed of the speed reducer causes the feedback signal from differentiator network 180 to be reduced to zero. This condition, in turn, causes amplifier output 194 to be driven to and held at its maximum negative voltage value, and thereby assures continuous energization of relay 82 and pump 106. In this region of operation, relief valve 156 opens and closes as necessary to maintain the hydraulic pressure at heads 48 and 50 at or below a desired ceiling value. As a result, the speed reducer system of FIGS. 1 through 3 will exhibit a desirable torque-limiting characteristic, since the braking force produced by brake mechanism 40 is limited by the above-mentioned maximum hydraulic pressure.

The fact that the speed reducer system of the invention has been described only within each of its three operating regions should not be taken to mean that the system cannot by itself shift between regions when load conditions require such a shift. If, for example, the reducer system is operating in its running (torque limited) region and should unexpectedly speed up, a positive feedback signal will appear at differentiator 180. If this signal is large enough and continues for long enough, it can cause amplifier output 194 to cross the negative threshold of the aforementioned "dead zone" and thereby turn off pump 106 to counteract the speed up, or even to assume a positive value sufficient to exceed the positive threshold of the "dead zone" and thereby turn on bleed valve 88. Thus, the speed reducer system of the invention is acceleration limited as well as torque limited as a result of being able to shift as necessary between its acceleration mode and its running mode when switch 179 is in the acceleration/run position shown in FIG. 3. No similar characteristic is present or desirable during operation in the deceleration mode, which mode can only be entered or exited as a result of the manual operation of switch 179.

When switch 179 is in position 173, i.e., in its hold or standby position, summing junction 178 is held at the potential of the system ground, as stated previously. In this mode, the system, if it is in motion, will simply hold at the existing pressure, since the integration of a net zero value error signal will allow integrating capacitor 196 to eventually discharge to zero through resistor 195, thereby causing amplifier output 194 to assume a value in the middle of the "dead zone". If, on the other hand, the system is at rest and switch 179 is in its hold or standby position, the system will remain at rest, since a zero value error signal will be continuously applied to integrator network 190. Thus, the middle position of switch 179 may be considered to hold or maintain existing hydraulic pressure conditions within the speed reducer system.

A dump solenoid operated valve 220 permits deactivation of the hydraulic system promptly in case of an emergency, or when the drive and the equipment are to be shut down without controlling the rate of deceleration. Line 222 connects line 142 with line 152, and hence the pressure of the hydraulic fluid which is transmitted to the brake heads 48 and 50 is relieved by the return flow of fluid to the sump through solenoid operated valve 220. Because valve 220 has no orifice such as 154 associated therewith, it permits rapid removal of the hydraulic brake control pressure by providing a high flow rate bleed path for the fluid in the hydraulic system. This rapidly removes reducer torque and effectively immediately disconnects the input from the driven load on the output shaft of the reducer.

In a modified form of the present control system, the fluid system of block 90 may be pneumatic rather than hydraulic, and a pressure creating means other than a pump may be used. For example, an air pressure tank or cylinder may be used as the pressure creating means for the fluid in line 126, with the pressure in the line being controlled by solenoid operated bleed valve 88 and a solenoid operated valve in the line connecting the tank with line 126. In this modification, the two solenoids are controlled in response to electrical signals representing positive and negative errors relative to the predetermined reference signal, with lead 86 being connected to the solenoid operated bleed valve and lead 80 to the solenoid operated valve in the tank line. The electronic and fluid systems otherwise operate essentially the same as previously described in detail herein with reference to the one utilizing hydraulic fluid as the pressure operating brake heads 48 and 50.

The foregoing embodiments of the present system provide an effective and reliable acceleration or deceleration control for variable speed drives having controlled transition between two different operating speeds. In the system described, the circuit senses the rotational speed of the output shaft and provides corrective output signals depending on whether the rate of change in the sensed output speed is greater or less than the desired rate of speed change. The system disclosed herein can be readily modified to adapt it to various applications and operating conditions without departing from the scope of the present invention.

We claim:

1. An acceleration and deceleration control system for mechanical power drives having a rotatable power output element and rotatable reaction element with a fluid operated brake means connected thereto, said system comprising a fluid system having a fluid pressure creating means, a line connecting said fluid pressure creating means with said brake means, a bleed line connected to the line between said pressure creating means and said brake means, an electrically controlled valve means in said bleed line, electrical means for sensing the rotational speed of said output element and converting the signal therefrom into an electrical signal for comparison against first and second reference signals, leads connecting said electrical means to said pressure creating means and said bleed line valve, whereby said pressure creating means is energized when the output of the electrical signal exceeds a first predetermined threshold value and said bleed line valve is energized when said electrical signal exceeds a second predetermined threshold value, to control the rotation of said reaction element to obtain a predetermined acceleration and deceleration rate of said output element.

2. An acceleration and deceleration control system as set forth in claim 1 wherein said electrical means includes a tachometer for generating a speed signal substantially proportional to the rotational speed of said output element, a differentiator circuit responsive to the signal from said tachometer, reference signal generating means for adjustably setting first and second reference signals, a summing junction, means for selectably connecting one of said reference signals and the output of the differentiator circuit to the summing junction, and control means responsive to the net signal at said summing junction for energizing and de-energizing said pressure creating means and said bleed valve.

3. An acceleration and deceleration control system as set forth in claim 1 wherein said control means includes integrating means for integrating the net signal at said summing junction, first driver means for energizing said pressure creating means when the output of said integrating means exceeds a first predetermined threshold signal and second driver means for energizing said bleed valve when the output of said integrating means exceeds a second predetermined threshold signal.

4. An acceleration and deceleration control system as set forth in claim 2 wherein said first and second reference signals are d-c signals having opposite polarities and wherein said first and second threshold signals are d-c signals having opposite polarities.

5. An acceleration and deceleration control system for mechanical power drives as defined in claim 1 in which an accumulator is connected to said line connecting said pressure creating means with said brake means.

6. An acceleration and deceleration control system for mechanical power drives as defined in claim 1 in which a line is connected to said first mentioned line and a valve is disposed in the line connected to said first mentioned line, responsive to and controlling the pressure in said first mentioned line.

7. An acceleration and deceleration control system for mechanical power drives as defined in claim 6 in which a restricted orifice is disposed in said bleed line.

8. An acceleration and/or deceleration control system for mechanical power drives having a rotatable power output element and rotatable reaction element with a hydraulic brake means connected thereto, said system comprising a hydraulic system having a source of hydraulic fluid, a pump means, a line connecting said source to said pump means, a motor for driving said pump means, a line connecting said pump means with said brake means, a bleed line connected to the line between said pump means and said hydraulic brake means, an electrically controlled valve means in said bleed line, electrical means for sensing the rotational speed of said output element and converting the signal therefrom into an electrical signal for comparison against first and second reference signals, leads connecting said electrical means to said pump means and said bleed line valve, whereby said pump means is energized when the output of the electrical signal exceeds a first predetermined threshold value and said bleed line valve is energized when said electrical signal exceeds a second predetermined threshold value, to control the rotation of said reaction element to obtain a predetermined acceleration and/or deceleration rate of said output element.

9. An acceleration and/or deceleration control system as set forth in claim 8 wherein said electrical means includes a tachometer for generating a speed signal substantially proportional to the rotational speed of said output element, a differentiator circuit responsive to the signal from said tachometer, reference signal generating means for adjustably setting first and second reference signals, a summing junction, means for selectably connecting one of said reference signals and the output of the differentiator circuit to the summing junction, and control means responsive to the net signal at said summing junction for energizing and de-energizing said pump means and said bleed valve.

10. An acceleration and/or deceleration control system as set forth in claim 8 wherein said control means includes integrating means for integrating the net signal at said summing junction, first driver means for energizing said pump means when the output of said integrating means exceeds a first predetermined threshold signal and second driver means for energizing said bleed valve when the output of said integrating means exceeds a second predetermined threshold signal.

11. An acceleration and/or deceleration control system as set forth in claim 9 wherein said first and second reference signals are d-c signals having opposite polarities and wherein said first and second threshold signals are d-c signals having opposite polarities.

12. An acceleration and/or deceleration control system for mechanical power drives having a rotatable power output element and rotatable reaction element with a fluid operated brake means connected thereto, said system comprising a fluid system having a fluid pressure creating means, a line connecting said fluid pressure creating means with said brake means, a bleed line connected to the line between said pressure creating means and said brake means, an electrically controlled valve means in said bleed line, electrical means for sensing the rotational speed of said output element and controlling said pressure creating means and said bleed line valve to obtain a predetermined acceleration and/or deceleration rate of said output element.

13. An acceleration and/or deceleration control system for mechanical power drives as defined in claim 12 in which an accumulator is connected to said line connecting said pressure creating means with said brake means.

14. An acceleration and/or deceleration control system for mechanical power drives as defined in claim 13 in which a line is connected to said first mentioned line and an electrically controlled dump valve is disposed in the line connected to said first mentioned line for rapid relief of the pressure in said first mentioned line.

15. An acceleration and/or deceleration control system for mechanical power drives as defined in claim 12 in which a line is connected to said first mentioned line and a valve is disposed in the line connected to said first mentioned line, responsive to and controlling the pressure in said first mentioned line.

16. An acceleration and/or deceleration control system for mechanical power drives as defined in claim 14 in which a line is connected to said first mentioned line and a valve is disposed in the line connected to said first mentioned line responsive to and controlling the pressure in said first mentioned line.

17. An acceleration and/or deceleration control system for mechanical power drives as defined in claim 12 in which a restricted orifice is disposed in said bleed line.

18. An acceleration and/or deceleration control system for mechanical power drives as defined in claim 16 in which a restricted orifice is disposed in said bleed line, posterior to said electrically controlled valve therein.

19. An acceleration and/or deceleration control system for mechanical power drives having a rotatable power output element and rotatable reaction element with a hydraulic brake means connected thereto, said system comprising a hydraulic system having a source of hydraulic fluid, a pump means, a line connecting said source to said pump means, a motor for driving said pump means, a line connecting said pump means with said brake means, a bleed line connected to the line between said pump means and said hydraulic brake means, an electrically controlled valve means in said bleed line, and electrical means for sensing the rotational speed of said output element and controlling said pressure creating means and said bleed line valve to obtain a predetermined acceleration and/or deceleration rate of said output element.

20. An acceleration and/or deceleration control system for mechanical power drives as defined in claim 19 in which a line is connected to said first mentioned line and a valve is disposed in the line connected to said first mentioned line, responsive to and controlling the pressure in said first mentioned line.

21. An acceleration and/or deceleration control system for mechanical power drives as defined in claim 19 in which a restricted orifice is disposed in said bleed line.

22. An acceleration and/or deceleration control system for mechanical power drives having a rotatable power output element, comprising means for restraining the rotational speed of said output element, means for releasing said restraining means, electrical means for sensing the rotational speed of said output element and converting the signal therefrom into an electrical signal for comparison against a reference signal, and leads connecting said electrical means to said restraining means and said releasing means, whereby said restraining means is actuated when the output of the electrical signal exceeds a first predetermined threshold value and said releasing means is actuated when said electrical signal exceeds a second predetermined threshold value to obtain a predetermined acceleration and/or deceleration rate of said output element.

23. An acceleration and/or deceleration control system as set forth in claim 22 wherein said electrical means includes a tachometer for generating a speed signal substantially proportional to the rotational speed of said output element, a differentiator circuit responsive to the signal from said tachometer, reference signal generating means for adjustably setting first and second reference signals, a summing junction, means for selectably connecting one of said reference signals and the output of the differentiator circuit to the summing junction, and control means responsive to the net signal at said summing junction for activating and de-activating said restraining and releasing means.

24. An acceleration and/or deceleration control system as set forth in claim 23 wherein said control means includes integrating means for integrating the net signal at said summing junction, first driver means for energizing said restraining means when the output of said integrating means exceeds a first predetermined threshold signal and second driver means for energizing said releasing means when the output of said integrating means exceeds a second predetermined threshold signal.

25. An acceleration and/or deceleration control system as set forth in claim 24 wherein said first and second reference signals are d-c signals having opposite polarities and wherein said first and second threshold signals are d-c signals having opposite polarities.

* * * * *